United States Patent [19]
Hsu et al.

[11] Patent Number: 5,858,568
[45] Date of Patent: Jan. 12, 1999

[54] FUEL CELL POWER SUPPLY SYSTEM

[75] Inventors: Michael S. Hsu, Lincoln; Robin Y. P. Ong, Lexington, both of Mass.

[73] Assignee: Ztek Corporation, Waltham, Mass.

[21] Appl. No.: 710,562

[22] Filed: Sep. 19, 1996

[51] Int. Cl.$^6$ .................................................. H01M 8/04
[52] U.S. Cl. ................................ 429/13; 429/12; 429/33; 180/65.3
[58] Field of Search ................................ 429/12, 13, 19, 429/33; 180/60, 65.1, 65.3

[56] References Cited

U.S. PATENT DOCUMENTS

| | | | |
|---|---|---|---|
| 3,321,334 | 5/1967 | Palmer | 429/26 |
| 3,441,444 | 4/1969 | Chesner et al. | 136/86 |
| 3,443,115 | 5/1969 | Timmerman, Jr. | 307/66 |
| 3,595,699 | 7/1971 | Baude | 136/86 B |
| 3,677,823 | 7/1972 | Trocciola | 429/20 |
| 3,843,410 | 10/1974 | Spahrbier | 136/86 R |
| 3,971,454 | 7/1976 | Waterbury | 180/65 |
| 4,081,693 | 3/1978 | Stone | 307/66 |
| 4,277,737 | 7/1981 | Muller-Werth | 320/2 |
| 4,614,628 | 9/1986 | Hsu et al. | 264/61 |
| 4,629,537 | 12/1986 | Hsu | 204/15 |
| 4,713,303 | 12/1987 | Farooque | 429/26 |
| 4,721,556 | 1/1988 | Hsu | 204/258 |
| 4,853,100 | 8/1989 | Hsu | 204/256 |
| 4,931,947 | 6/1990 | Werth et al. | 364/492 |
| 4,961,151 | 10/1990 | Early et al. | 364/492 |
| 4,962,462 | 10/1990 | Fekete | 180/65.5 |
| 4,988,283 | 1/1991 | Nagasawa et al. | 429/17 |
| 5,105,142 | 4/1992 | Takabayashi et al. | 429/13 |
| 5,248,566 | 9/1993 | Kumar et al. | 429/19 |
| 5,332,630 | 7/1994 | Hsu | 429/20 |
| 5,470,670 | 11/1995 | Yasumoto et al. | 429/20 |
| 5,532,573 | 7/1996 | Brown et al. | 322/22 |
| 5,631,532 | 5/1997 | Azuma et al. | 320/5 |
| 5,678,647 | 10/1997 | Wolfe et al. | 429/33 |
| 5,725,062 | 3/1998 | Fronek | 180/2.2 |

FOREIGN PATENT DOCUMENTS

| | | |
|---|---|---|
| 0334474 | 9/1989 | European Pat. Off. . |
| 0 755 088 A2 | 1/1997 | European Pat. Off. ......... H01M 8/16 |
| 4001684 | 7/1991 | Germany . |
| 4116899 | 11/1991 | Germany . |
| 59-136006 | 8/1984 | Japan . |
| 63-002263 | 1/1988 | Japan . |
| 63-143756 | 6/1988 | Japan . |
| 1-166470 | 6/1989 | Japan . |
| 1-320773 | 12/1989 | Japan . |
| 2132108 | 7/1984 | United Kingdom . |
| WO93/09572 | 5/1993 | WIPO ............................ H01M 8/00 |

OTHER PUBLICATIONS

"Fuel Cell Power Source System," *Japanese Patent Abstracts*, vol. 12, No. 261 (Feb. 1988).

Adcock et al., "Prospects for the Application of Fuel Cells in Electric Vehicles," *Journal of Power Sources*, vol. 37, pp. 201–207 (Jan. 1992).

Chi et al., "Air–Cooled PAFC and Ni–Cd Batteries—A Marriage That Works?" *Proceedings of the 23rd Intersociety Energy Conversion Engineering Conference*, vol. 2, pp. 233–238 Jul. 31, 1988–Aug. 5, 1988.

"Fuel Cells for Transportation;" *Advanced Energy Systems, Mechanical Engineering*: Aug. 1989 pp. 74–77.

*Primary Examiner*—Stephen Kalafut
*Assistant Examiner*—Carol Chaney
*Attorney, Agent, or Firm*—Thomas J. Engellenner; Anthony A. Laurentano; Lahive & Cockfield, LLP

[57] ABSTRACT

A power supply system for enhancing the economic viability of different modes of transportation that incorporate fuel cells to generate electricity. For example, the power supply system of the present invention provides for the off-board use of the electric power generated by an on-board power plant, such as a fuel cell, of a mobile vehicle power system, such as an electric car. Off-board use, or use remote from the vehicle, of the electrical power includes the delivery of power to a remote site. Off-board stations are provided for delivery of fuel to the vehicle and/or for receiving the electrical power generated by the fuel cell. The off-board station and the vehicle are appropriately equipped for quick and easy interconnection such that electrical power is drawn from the fuel cell for off-board use.

42 Claims, 4 Drawing Sheets

Ø,858,568

FUEL CELL POWER SUPPLY SYSTEM

BACKGROUND OF THE INVENTION

The invention relates generally to the field of propulsion systems. In particular, the invention concerns an on-board fuel cell system for mobile vehicles such as trains, marine vessels, automobiles and other mobile means of transportation.

As concerns surrounding traditional power sources persist, investigation into alternative means of power generation are becoming increasingly important. In particular, environmental and political concerns associated with combustion-based energy systems cannot be ignored. In an effort to reduce dependence on these types of power supplies and methods, interest is increasing in devices capable of generating electricity by consuming fuels without requiring combustion.

In addition to being utilized for the generation of electricity, however, combustion processes are most commonly used to power means of transportation such automobiles, trains, or marine vessels. Motor vehicles alone are among the chief contributors to pollution problems associated with combustion of fuel. So, while alternative power sources such as nuclear and hydroelectric systems may be suitable for large scale electric utilities, they do not present an ideal solution to the problems associated with powering means of transportation such as motor vehicles.

Alternatives to internal combustion engine powered motor vehicles have included various types of electric vehicles. Electric vehicles are well known in the art. Typical electric vehicles are powered by nickel-cadmium batteries which drive electric motors of anywhere from twenty to 100 horsepower. The batteries are generally rechargeable by stationary direct current (dc) power supplies. A problem with known systems, however, is that they require constant recharging and offer limited range between required recharging stops.

Known systems are also expensive. Solar rechargeable systems, such as are available from Solectria of Arlington, Mass., represent one attempt to increase the travel range and control the cost of electric motor vehicles. Drawbacks associated with the solar generation of electricity, however, include its usefulness being limited to clear weather and daylight hours, and the expense of the vehicle.

Fuel cells, therefore, have been explored as a means for powering electric vehicles and reducing the constant need to recharge the vehicle from off-board sources. Fuel cells electrochemically convert fuel, such as hydrocarbon fuel, to electricity. Typically, a combustion reaction is not involved.

A drawback associated with prior art fuel cell systems, however, is that they are not economically viable for applications in which the power rating of the fuel cell must meet propulsion demands. In motor vehicle applications, for example, a fuel cell system designed to provide sufficient power required by the vehicle for cruising, let alone for peak surge, would be prohibitively expensive. While various known systems have attempted to exploit the advantages of designating a surge battery to meet peak demand in motor vehicle applications, none has satisfactorily overcome the economic problems.

It is an object of the invention, therefore, to provide a system for powering a motor vehicle which does not require a combustion reaction.

It is another object of the invention to provide such a system which has a range comparable with that of traditional combustion engines without requiring interruptive recharging from off-board sources.

It is still another object of the invention to provide an economically feasible system for powering a motor vehicle which can accommodate typical motor vehicle surge and range demands.

It is yet another object of the invention to provide a fuel-cell powered vehicle that is capable of generating power for off-board consumption.

Other general and more specific objects of the invention will in part be obvious and will in part appear from the drawings and description which follow.

SUMMARY OF THE INVENTION

The present invention relates to a power supply system that enhances the economic viability of certain means of transportation that incorporate fuel cells to generate electricity. Such means of transportation are referred to herein as mobile vehicle fuel cell power systems, where vehicle, as used herein, refers to all means of transportation, for example, automobiles, trucks, trains, marine vessels, airplanes and spacecraft. For example, the power supply system of the present invention provides for the off-board use of the electric power generated by the on-board fuel cell of a mobile vehicle fuel cell power system such as an electric car. Off-board use, or use remote from the vehicle, of the electrical power can include delivery of power to a remote site, such as a local residence, for example, the residence of the owner of the vehicle, or to a local utility power grid, or to another mobile vehicle.

Off-board stations are provided for delivery of fuel to the vehicle and for receiving the electrical power generated by the fuel cell. The off-board station and the vehicle are appropriately equipped for quick and easy interconnection such that electrical power is drawn from the fuel cell for off-board use. In addition, the off-board station can be equipped to deliver fuel to the vehicle, with similar provisions for the quick interconnection of the vehicle and the off-board station. Vehicles can be considered mobile fuel cell systems that deliver power for off-board use when power from the fuel cells is not required for on-board uses, such as propelling the vehicle. Fuel cells may be incorporated into mobile vehicles in a number of ways. For example, fuel cells can be used in tandem with a gas turbine to propel a vehicle, such as a marine vessel or a train.

Note that the on-board use of the fuel cell need not be limited to, or even involve, propelling the vehicle or vessel. For example, fuel cells can be used to provide heating, ventilation and air conditioning (HVAC) systems.

According to other examples, a marine vessel can use an on-board fuel cell for on-board HVAC and for the provision of on-board electrical power; off-board uses can include the delivery of electrical power to an off-board station when the vessel is in port.

According to another aspect, the invention can employ from one to many off-board stations. For example, the owner or principal user of an electric vehicle can have an off-board station located near a primary residence. Alternatively, off-board stations can be provided at locations where electric vehicles are typically parked for an extended period of time, such as homes, shopping malls, parking lots and places of employment. The off-board station is can be electrically connected through power cables to a utility grid, to transmit a portion of the electrical power produced by the on-board fuel cell to a remote site for use. Conductive power cables, however, are not the only means for the high efficiency transmission of electrical power; such transmission has been demonstrated over free space using microwaves. Whatever the means of power transmission, the dual use of the vehicle fuel cell power plants, that is, use wherein the fuel cell supplies power for both on-board and off-board purposes, is intended to enhance the economic viability of mobile vehicle fuel cell power systems, promote the use of alternative power sources, and realize the attendant environmental benefits.

In another aspect, the invention comprises a power supply system for converting fuel to electricity, where the power supply system includes a mobile vehicle fuel cell power system and an off-board station. The mobile vehicle fuel cell power system further includes a rechargeable battery; a fuel cell for converting fuel to electricity and for recharging the battery; optionally a fuel supply for storing and providing fuel to the fuel cell; and apparatus for electrical connection to the off-board station for delivering to the off-board station the electricity generated by the fuel cell. The mobile vehicle fuel cell power system can also include apparatus for receiving fuel from the off-board station.

The off-board station typically includes apparatus for receiving electrical power from the mobile vehicle fuel cell power system and output apparatus for providing at least a portion of the electrical power for use off-board of the mobile vehicle fuel cell power system. The receiving apparatus can include, but need not necessarily include, electrical cables and/or receptacles for mating with cables. Output apparatus can, but need not necessarily include, a relay and/or a switch for electrical connection to an off-board site. A simple off-board station can comprise, for example, a receptacle, for electrically coupling with a cable connected to the mobile vehicle, and some electrical wiring attached to the receptacle for transmitting electrical power for off-board use. The off-board station can also include apparatus for delivering fuel to the mobile vehicle fuel cell power system.

In one instance, the fuel supplied by the off-board station and received by the mobile vehicle fuel cell is a hydrogen-containing fuel. However, the fuel can be a hydrocarbon fuel, in which case a fuel reformer, and perhaps a fuel shifter, are included on-board the vehicle for producing a hydrogen-containing fuel. Alternatively, a fuel reformer, and perhaps a fuel shifter, are part of the off-board station. In the latter case the off-board station can include a fuel storage tank for storing reformed fuel. Furthermore, hydrocarbon fuels often contain sulfur. Sulfur in significant quantities causes corrosion of the fuel cell and can destroy certain catalysts of the reformer and the fuel cell electrodes, as well as contributes to air pollution and acid rain when discharged into the air. Accordingly, a desulfurization unit can be incorporated in the present invention to remove sulfur prior from the fuel prior to the delivery of the fuel to the reformer. The desulfurization unit can form part of, according to one aspect, the off-board station, or the mobile vehicle fuel cell power unit.

Reactants for aiding the fuel reformation process are known in the art. Accordingly, in another feature of the invention, a reactant such as water is supplied to the reformer, whether located on-board the vehicle or at the off-board station, to aid in the reformation process. If the reformer is on-board, appropriate means are employed for supplying water to the vehicle. For example, water is supplied to the off-board station, and appropriate ports are provided at the station and on the vehicle, to accommodate a quick-connect hose connected therebetween. The power system of the present invention can include apparatus to filter and/or de-ionize the water, if such treatment is necessary. Note, however, that a reformer can be designed to simply utilize an oxidizer (e.g. air) instead of a reactant such as water. Use of a reformer, either on-board of off-board, need not require incorporation of means to deliver a reactant such as water to the reformer.

According to another aspect of the invention, meters are incorporated into the power supply system for metering, for example, the fuel received by the electric vehicle from the off-board station. Similarly, an electric meter can be also be used to measure the electrical energy or power delivered from the vehicle to the off-board site or from the off-board site to another location, e.g. the power grid or a local residence, for use remote to the vehicle.

A typical fuel cell produces direct current electrical power; a typical residence or utility power grid employs alternating-current electrical power. Accordingly, in one aspect of the invention, the off-board station includes an inverter or inverters for converting the direct-current electrical energy produced by the vehicle fuel cell to single-phase or multi-phase electrical power. A typical utility power grid transmits three-phase electrical power, and thus an off-board station, if supplying power to the grid, converts fuel cell electric power to three-phase alternating current. Alternatively, the inverter or inverters can be located on the mobile vehicle fuel cell power system to provide alternating current for off-board and/or off-board use. For example, if the mobile vehicle fuel cell power system is a train or a supertanker, the inverters can be located thereon. Of course, if direct current is desired for use remote to the vehicle, the off-board station need not employ an inverter for converting direct-current to alternating-current. The type of electric power meter employed in the power system depends on whether direct current or alternating current power is to be measured.

In yet another aspect, the off-board station includes a two-way or one-way telecommunications link to report condition parameters of the station, and perhaps of the electric vehicle, to another location. Condition parameters can include, but are not limited to, the quantity of fuel delivered to a vehicle, the amount of electricity supplied by the fuel cell of the vehicle for use remote to the vehicle, the identity of the vehicle or of the owner of the vehicle, and other usable parameters. The communications link can also transmit to the off-board station and/or the vehicle instructions for execution.

Many types of fuel cells are known to those of ordinary skill in the art to be useful in with electric vehicles. Accordingly, it is deemed within the scope of the invention to use several types of fuel cells, including but not limited to, solid oxide fuel cells, molten carbonate fuel cells, phosphoric acid fuel cells, alkaline fuel cells, and proton exchange membrane fuel cells.

The power system of the present invention envisions the off-board use of electrical power generated on-board the mobile vehicle fuel cell power system via the interconnection of the mobile vehicle fuel cell power system with an off-board station. However, the practice of the invention need not involve the use of an off-board station exactly in the manner described above. For example, a mobile vehicle fuel cell power system may be electrically connected to a second mobile vehicle electrical power system, such as another electrical vehicle, to recharge the batteries of the other vehicle. In this instance, the vehicle whose batteries are being recharged serves as a type of off-board station. The vehicles are appropriately equipped for quick and convenient interconnection. Both can include apparatus, such as male electrical receptacles, for coupling with the female connectors of a power cable connected between the fuel cell mobile vehicle power system and the second mobile power system for transferring electrical power therebetween. As both vehicles operate on dc power, an inverter is not always necessary. Note that the second mobile power system can be a fuel cell vehicle or a conventional (e.g., non- fuel cell) electric vehicle.

According to another aspect, the power system of the present invention is also deemed to include vehicles that do not employ fuel cells. For example, a mobile vehicle power system according to the teachings of the present invention can use traditional power plants, such as a combustion engine, an electrical generator, a battery, steam or gas turbines or generators and other power forms, such as solar power. The generator converts the mechanical energy of the combustion engine to electrical energy for on-board use, off-board use, and/or for storage by the battery. When the vehicle is coupled to an off-board station, the power plant delivers electricity to the off-board station for use off-board the vehicle and optionally receives fuel from the off-board station. The combustion engine can be an internal combustion engine, for example a diesel or gasoline engine, or an external combustion engine, such as a steam engine or a stirling engine. The mobile vehicle power system can include an electric motor for propelling the vehicle, as is typical in a diesel-electric train engine, or the combustion engine may propel the vehicle directly, as is typical in conventional automobiles.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
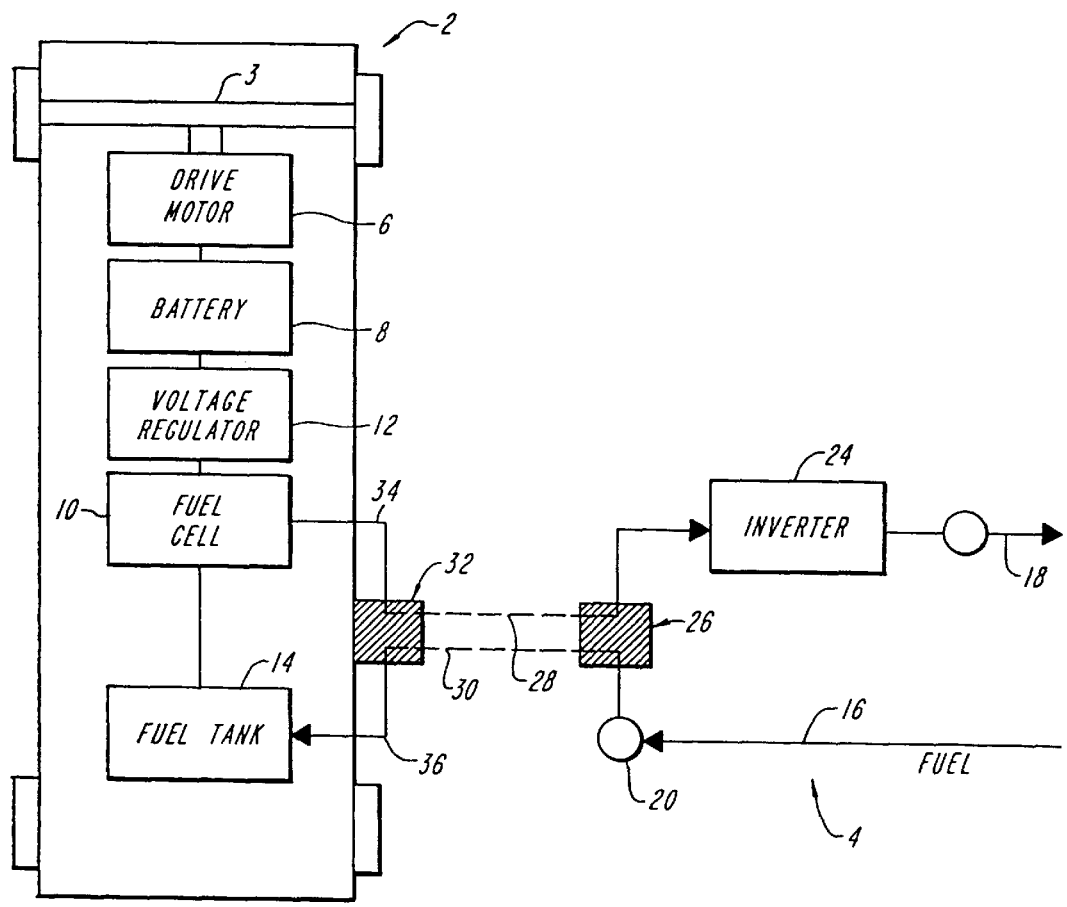
FIG. 1 is a block diagram of a power supply system according to the invention, illustrating a vehicle that includes an on-board fuel cell power plant and further including an off-board station for connection to the vehicle.

FIG. 1 is a block diagram of a power supply system according to the invention, illustrating an electric vehicle 2 and an off-board power station 4. The vehicle power system includes a fuel cell assembly 10 which is electrically connected to a rechargeable battery 8. The battery 8 is connected to an electric motor 6 which drives a motor vehicle drive train 3. The fuel cell assembly 10 receives fuel such as, for example, natural gas, from a fuel supply tank 14 and electrochemically converts it to electricity, as is known in the art, to recharge the battery 12. Arranged between the fuel cell assembly 10 and the battery 8 is a voltage regulator 12. The foregoing circuitry is known to those skilled in the art of motor vehicles in general and electrically powered motor vehicles in particular.

The illustrated fuel cell assembly 10 does not necessarily provide power to the electric motor 6 directly. Rather, the fuel cell assembly 10, the battery 8, and the electric motor 6 act together to power the vehicle. The fuel cell assembly 10, under steady operation, can be utilized for on-board recharging of the battery 8. The battery 8 is typically under a variable load demand, depending on the terrain, the speed of the vehicle, etc. The fuel cell assembly 10 is electrically connected to the voltage regulator 12, which is in turn electrically connected to the battery 8 to transfer recharging electrical energy from the fuel cell assembly 10 to the battery 8.

The fuel cell assembly 10 can comprise, for example, a solid oxide fuel cell. A solid oxide fuel cell is an electrochemical converter which employs solid oxide electrolytes. Such converters are capable of high efficiencies, depending only on the relation between the free energy and enthalpy of the electrochemical reaction. An example of a solid oxide fuel cell is described in U.S. Pat. No. 4,614,628, issued Sep. 30, 1986 to Hsu et al, the teachings of which are hereby incorporated by reference.

Alternatively, an on-board fuel cell power plant 10 that uses hydrogen as a fuel, or an on-board fuel cell that is capable of internal reforming and that consumes a hydrocarbon fuel, can be installed in the vehicle 2. Other types of suitable fuel cells known to those of ordinary skill in the art include molten carbonate fuel cells, phosphoric acid fuel cells, alkaline fuel cells and proton exchange membrane fuel cells. Additional details on electric vehicles and fuel cells for incorporation therein can be found in U.S. Pat. No. 5,332,630, issued Jul. 26, 1994 to Hsu, and which is herein incorporated by reference.

With reference to FIG. 1, the off-board station 4 includes a fuel line 16 for supplying fuel from a fuel source (not shown) to the vehicle 2, and a power line 18 for receiving and transferring electric power generated by the fuel cell 10 for direct use at a residence or other facility, or for provision to an electric power grid. The fuel meter 20 meters the amount of fuel delivered by the off-board station 4 to the fuel tank 14 of the vehicle 2. The electric power meter 22 measures the amount of electricity delivered by the vehicle for off-board use.

The station 4 can further include an inverter for conversion of the direct current electrical power typically generated by the fuel cell 10 to single phase, or if necessary multiphase, alternating current typically compatible with the electric power grid.

Power and fuel are transferred between the vehicle 2 and the off-board station 4 by a power line 28 and a hose 30, respectively. The power line 28 and the fuel line 30 interconnect the vehicle 2 and the off-board station 4 via the vehicle access panel 32 and the off-board station access panel 26. The off-board station 4 access panel 26 and the vehicle 2 access panel 32 each comprise two access sub-panels—a fuel sub-panel for accommodating the fuel line 30 and an electrical sub-panel for accommodating the electrical power line 28, as is described in more detail in relation to FIG. 4. The fuel sub-panel (27 in FIG. 4) of off-board access panel 26 is separate from the electrical sub-panel (29 in FIG.

4) to avoid the risk of explosion due to stray sparks igniting fuel. Vehicle 4 access panel 26 is similar to the off-board station access panel 26 depicted in FIG. 4.

A power line 34 electrically connects the electrical access panel of vehicle access panel 32 to the fuel cell 10; the fuel sub-panel of access panel 32 is connected to the fuel tank 14 by a fuel line 36. The off-board station access panel 26 is similarly connected to the power line 18 and the fuel line 16.

Lines 30 and 28 are preferably of the quick interconnect type, such that a driver of the electric vehicle, upon parking the vehicle, can easily and quickly interconnect the vehicle access panel 32 with the off-board access panel 26. Many types and variation of the lines 28 and 30 are known to those of ordinary skill in the art. For example, the lines 28 and 30 can have male connectors on each end, and the access panels 26 and 32, can be equipped with mating female receptacles. Alternatively, the lines 28 and 30 can be permanently attached at one end to the access panels 26 or 32 and connect via connectors to the other access panel. Many variations are possible, as is readily appreciated by those of ordinary skill in the art. Typically, however, a cable for the transmission of electrical power will not have male connectors on an end, as this could expose a user of the cable to dangerous voltages and/or currents. More detail on the interconnection of the station access panel 26 and the vehicle access panel 32 is given below.

Figure 2:
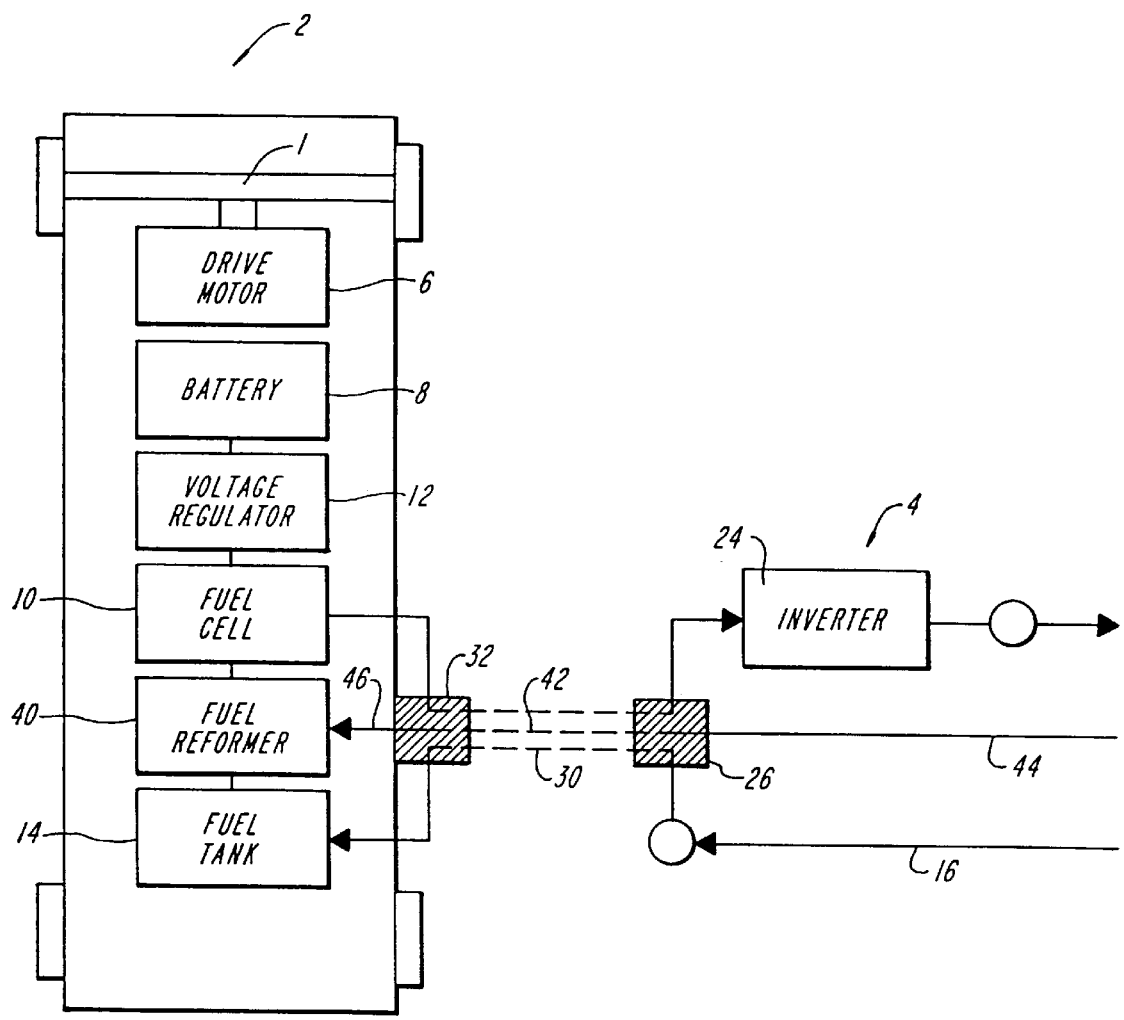
FIG. 2 is a block diagram of an alternate embodiment of the power supply system that includes a fuel reformer on-board the electric vehicle according to the teachings of the present invention.

FIG. 2 is a block diagram of a power supply system that includes an on-board fuel reformer 40 that is connected between the fuel tank 14 and the fuel cell 10. The reformer produces, from a hydrocarbon fuel, a hydrogen-containing or hydrogen-rich reformed fuel for the fuel cell. A fuel shifter (not shown) may also be included in a series connection with the fuel reformer 40 to assist in the formation of hydrogen-rich fuel. The fuel shifter is typically filled with a shift catalyst that converts carbon monoxide present in the fuel stream into carbon dioxide, producing fuel stock rich in hydrogen. The removal of carbon monoxide from the fuel stream is essential to prevent carbon monoxide poisoning of certain fuel cells. The fuel mixture exiting the shift converter is thus rich in carbon dioxide and hydrogen An additional interconnection line 42 can be used between the vehicle access panel 32 and the off-board station panel 26 to provide appropriate reactant (e.g., water) for the reformer 40 to facilitate the reformation process. According to one practice, the water line 44 provides water to the station access panel 26 and the line 46 transfers the water from the vehicle access panel 32 to the fuel reformer 40. The fuel lines 16 and 30 supply a hydrocarbon fuel for reformation by the reformer 40.

Figure 3:
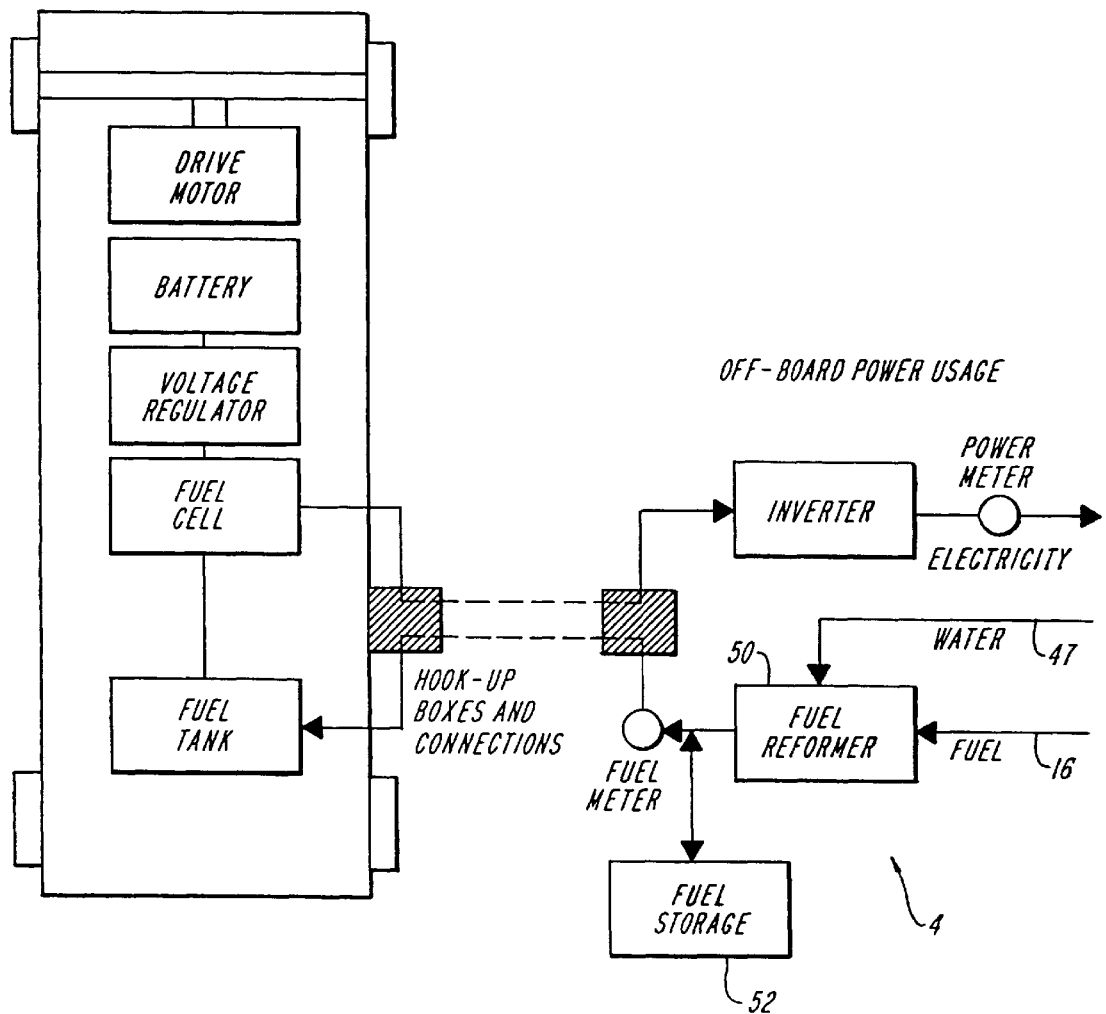
FIG. 3 is a block diagram of another embodiment of the power supply system wherein the off-board station includes a fuel reformer and a fuel storage tank.

FIG. 3 is a block diagram of an alternate embodiment of the power supply system in which the off-board station 4, rather than the vehicle 2, includes the fuel reformer 50, and, optionally, a fuel storage tank 52. The off-board station 4 receives a hydrocarbon fuel from the fuel line 16. The fuel reformer 50 converts the hydrocarbon fuel supplied from the fuel line 16 to a hydrogen-containing fuel that is stored in the fuel storage tank 52 and/or supplied to the mobile vehicle fuel cell power system for use by the fuel cell 10. The off-board station 4 can optionally include a fuel shifter (not shown) for increasing the hydrogen content of the reformed fuel produced by the fuel reformer 50. The hydrogen rich fuel produced by the fuel shifter is then available for storage in the fuel storage tank 52 or for supply to the mobile vehicle fuel cell power supply system 2. The off-board station 4 can also include a water line 48 for delivering water received from a water source (not shown) to the fuel reformer for use in the fuel reformation process. In the systems illustrated in FIGS. 2 and 3, thermal-electric or other means can be employed to prevent freezing of the water used for reformation.

As discussed previously, the power system of the present invention can include de-ionization and filtering equipment for the water reactant, as well as desulfurization equipment for the hydrocarbon fuel.

Figure 4:
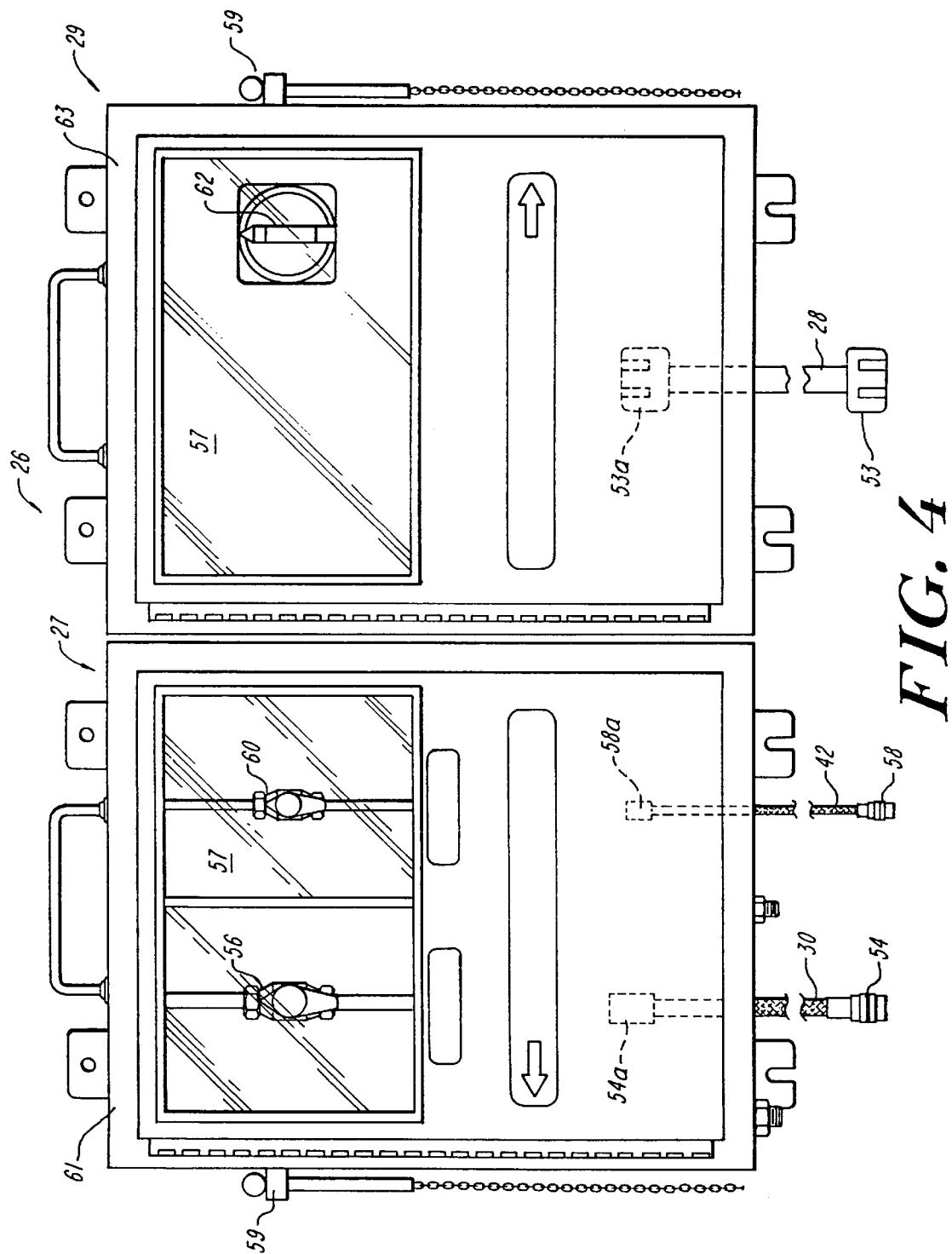
FIG. 4 is an illustration of the access panel of an off-board station for quick attachment of fuel and power lines to a mobile vehicle fuel cell power system.

FIG. 4 illustrates one example of mobile power plant 32 or off-board station access panels 26 according to the present invention. Those of ordinary skill will appreciate that other embodiments of the access panels 26, 32 exist and would effectuate the coupling of the vehicle 2 to the off-board station 4. The embodiment shown in FIG. 4 is therefore illustrative and not limiting.

The panels 26, 32 illustrated in FIG. 4, for example, can comprise two separate sub-panels, a gas and water sub-panel 27 and an electrical sub-panel 29. Attached to gas and water sub-panel 27 is a fuel gas supply hose 30 having quick disconnect, 1 inch tube female connectors, such as connector 54, on each end of hose 30. The end of hose 30 shown in phantom with female connector 54a in FIG. 4 mates with an auto-close male connector (not shown) mounted on the access panel 27 internal to housing box 61. A fuel shut off valve 56 is also provided. Similarly, the water supply hose 42 employs quick disconnect, ¼ inch tube auto-close female connectors 58 and 58a, and a shut-off valve 60. The electrical switch 62 is mounted in electrical sub-panel 29 and can be a single position safety manual lever 3-phase switch for electrical connection of the off-board station to, for example, the local utility power grid. The electrical power cable 28 has two female connectors, such as connector 53, on each end of the cable 28. The electrical connector 53 mates with a male connector of panel 32 (not shown) of the vehicle 2. The other end of the electrical cable 28 shown in phantom with connector 53a, connects to a male connector (not shown) of electrical access panel 29, and housed inside the box 63, to be described below.

Flexible interconnecting hoses and cables, such as the hoses and cables 28, 30 and 42 for interconnecting the access panels 26 and 32, can be bundled together. Typically, the hoses 28, 30 and 42 are between 5 feet and 50 feet in length. Alternatively, quick disconnect male connectors can be used on both ends of the hoses and cables and appropriate auto-close female connectors located on vehicle access panel 32 and the off-board station access panel 26.

Typically, the sub-panels 27 and 29 are standardized. The sub-panels 27 and 29 of the present invention can include housing boxes, such as box 61 for enclosing gas and water sub-panel 27 and housing box 63 for enclosing electrical access panel 29. Electrical housing box 63 can house, in addition to switch 62, other electrical equipment, such as a cutout relay (not shown). Separate boxes house the gas and electrical connections, to avoid combustion of the gas due to stray sparking of electrical contacts. Typically, the panel boxes 61 and 63 include holes for wall mount. The boxes are preferably locked. The housing boxes 61 and 63 include glass panels 57 that can be broken in an emergency with a striking implement, such as one of the hammers 59, to provide emergency access to the gas valve 56, water valve 60 and to switch 62. The access panels 26, 32 can also include a telecommunication link, such as a telephone jack (not shown) for communication of information to another location, as is described in more detail below.

The off-board station 4 illustrated in FIGS. 1–4 can additionally include at least one communications link, such as a telephone link, and appropriate communication hardware and software, such as a programmed computer including a modem, for monitoring the status of the off-board station 4. Information transmitted over the communications line to a central or other location can include the security status (e.g., has the station been vandalized or otherwise rendered inoperative) of the off-board station 4. Other information can include the quantity of fuel, as measured by the fuel meter, delivered to each individual vehicle and the electrical power, as measured by the power meter, delivered for use off-board of the vehicle. A communication link can be established with a vehicle attached to the station 4 by which the vehicle is identified for accounting purposes. In such a manner, the operation of the station 4 can be monitored such that an accounting is made of the fuel consumed by and the electricity generated by a particular vehicle. Credits and debits can be automatically made to the credit card of a vehicle owner or user.

One of ordinary skill in the art, possessed of the teachings herein, can readily substitute alternate types of communication links for a telephone link Other feasible forms of communicating links include conductive wires, optical fibers, coaxial cables, and transmission through free-space of electromagnetic energy such as radio waves, microwaves, or infrared beams. A telecommunication link can involve, for example, transmission to satellites, or to ground based stationary and/or mobile receivers. These techniques are well-known and oft employed by those skilled in the art of telecommunications for communicating signals, and are deemed to fall within the scope of the present invention.

As a more specific example of a telecommunications link that can be employed with the present invention, a weather-resistant housing is attached to the side of one of the boxes 61 and 63 enclosing the access panel 26. The housing contains a transceiver communication circuit and disposes an antenna of the circuit with a selected orientation for reliable communication with a remote transmitter or receiver. The weather-resistant housing can be formed with two mating portions, a base portion and a cover portion. A printed circuit board, having the communication circuit and the antenna fabricated on it, can mount to one portion. The system can include a support fitting for orienting the circuit board, and thus the antenna, to maximize broadcast and/or reception range. The cover portion is a radome, that is, it does not substantially impede the transmission of radio waves at the frequencies or frequency used by the transceiver.

Additionally, each off-board station 4 can serve as a refueling station for multiple-fuel cell electric vehicles.

Many of the fuel cells suitable for use in the present invention maintain their internal temperature at a sufficiently high level to effectively and efficiently generate electricity. In operation, the fuel cell typically generates considerable heat, and a circulating fluid, perhaps in combination with a moveable heat reflector shield, can be integrated into the design, as discussed in U.S. Pat. No. 5,332,630, issued Jul. 26, 1994 to Hsu, and which is herein incorporated by reference. However, during initial startup of a power cell system, the fuel cell may require heating. Accordingly, off-board station 4 can include structure for pre-heating heating the on-board fuel cell 10. For example the inverter 24, can be reversed to rectify alternating current received from the utility grid. The rectified power can be supplied to the fuel cell 10 to warm or "start-up" the fuel cell. The off-board station 4 can also include a cutout relay to shut off power flow to the fuel cell 10 from the grid once the cell 10 is at or near its operating temperature and capable of providing electric power. The relay also connects the line 32 to the inverter 24 such that the fuel cell 10 delivers power to the grid. If the off-board station 4 provides power to a stand-alone user rather that to an electric utility grid, an auxiliary power unit, such as a diesel or gasoline generator, can be included with the off-board station 4 to provide power for pre-heating the fuel cell 10.

Alternatively, the fuel cell 10 can be pre-heated by circulating a heated fluid in the fuel cell 10 cooling system. Appropriate provision can be made at the off-board station 4 for heating a fluid and for delivery of the fluid to the fuel cell cooling system. Appropriate hoses and connectors can be provided at the access panels 26 and 32.

The fuel cell, if properly designed, can also be preheated by the heat generated by internally combusting fuel.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by letters patent is:

1. A power system for converting fuel to electricity, comprising a mobile vehicle fuel cell power system and an off-board station, the mobile vehicle fuel cell power system includes a rechargeable battery, motor means coupled to said battery for propelling the vehicle, a fuel cell for converting fuel to electrical power and for connection to said battery to recharge said battery for powering, storage means for storing fuel for said fuel cell, and means for coupling to said off-board station for delivering thereto electrical power generated by said fuel cell when not required for propelling the mobile vehicle, and said off-board station includes means for receiving electrical power from said mobile vehicle fuel cell power system, and output means for providing at least a portion of said electrical power for use off-board of said mobile vehicle fuel cell power system.

2. The power system of claim 1 wherein said off-board station further comprises means for delivering fuel to said mobile vehicle fuel cell power system, and said mobile vehicle fuel cell power system includes means for receiving fuel from said off-board station for provision to said fuel cell.

3. The power system of claim 2 wherein said fuel comprises a hydrocarbon fuel.

4. The power system of claim 2 wherein said fuel is a hydrocarbon fuel, and said mobile vehicle fuel cell power system is capable of reforming the hydrocarbon fuel.

5. The power system of claim 2 further including a fuel meter for metering the fuel delivered to said mobile vehicle power system fuel cell.

6. The power system of claim 1 wherein said mobile fuel cell power system includes inverting means for converting direct current generated by said fuel cell to alternating current for on-board or off-board use.

7. The power system of claim 1 wherein said off-board station further includes inverting means for converting the electrical power supplied to said station from said mobile vehicle fuel cell power system from direct current to alternating current for use off-board of said mobile vehicle fuel cell power system.

8. The power system of claim 7 wherein said off-board station further includes power meter means for measuring the amount of alternating current power supplied by said output means for off-board use.

9. The power system of claim 1 wherein the electrical power provided by said output means for off-board use is direct current electrical power, and wherein said power system further includes a direct current power meter for measuring said direct current electrical power.

10. The power system according to claim 2 wherein said fuel cell is chosen from the group consisting of a solid oxide fuel cell, a molten carbonate fuel cell, a phosphoric acid fuel cell, an alkaline fuel cell, and a proton exchange membrane fuel cell.

11. The power system according to claim 2 wherein said mobile vehicle fuel cell power system further includes at least one of a fuel reformer and a fuel shifter to produce hydrogen-containing fuel for said fuel cell.

12. The power system of claim 11 further including a fuel meter for metering the fuel delivered to said power system.

13. The power system of claim 11 wherein the off-board station includes water supply means for providing water to said fuel reformer.

14. The power system of claim 11 wherein said off-board station further includes inverting means for converting the electrical power supplied to said station by said mobile vehicle fuel cell power system from direct current to alternating current, and wherein said output means provides said alternating current for use off-board of said mobile vehicle fuel cell power system.

15. The power system of claim 14 wherein said off-board station further includes power meter means for measuring the amount of alternating current power supplied by said output means for off-board use.

16. The power system of claim 11 wherein the electrical power provided by said output means for off-board use is direct current electrical power, and wherein said power system further includes a direct current power meter for measuring said direct current electrical power.

17. The power system of claim 11 wherein said fuel cell is chosen from the group consisting of a solid oxide fuel cell, a molten carbonate fuel cell, a phosphoric acid fuel cell, an alkaline fuel cell, and a proton exchange membrane fuel cell.

18. The power system of claim 2 further wherein said off-board station further comprises
   a fuel reformer for producing a hydrogen-containing fuel from a hydrocarbon fuel, and
   a second fuel storage means for storing said hydrogen-containing fuel produced by said fuel reformer.

19. The power system according to claim 18 further including a fuel meter for metering the fuel delivered to said mobile vehicle power system fuel cell.

20. The power system of claim 18 wherein said off-board station includes means for supplying water to said reformer.

21. The power system of claim 18, wherein said off-board station further comprises a fuel shifter for receiving hydrogen-containing fuel from said fuel reformer and for producing from said hydrogen-containing fuel a hydrogen fuel for supply to said mobile vehicle fuel cell power system.

22. The power system of claim 18 wherein said off-board station further includes
   inverting means for converting the electrical power received from said mobile vehicle fuel cell power system from direct current to alternating current, wherein said output means provides alternating current for use off-board of said mobile vehicle fuel cell power system, and
   power meter means for measuring the amount of alternating current power supplied by said output means for off-board use.

23. The power system of claim 18 wherein the electrical power provided by said output means for off-board use is direct-current electrical power, and wherein said power system further includes a direct-current power meter for measuring direct-current electrical power.

24. The power system according to claim 18 wherein said fuel cell is chosen from the group consisting of a solid oxide fuel cell, a molten carbonate fuel cell, a phosphoric acid fuel cell, an alkaline fuel cell, and a proton exchange membrane fuel cell.

25. A power system, comprising
   an off-board station for use with a mobile vehicle fuel cell power system having a fuel cell for converting fuel to electrical power,
   electrical connection means adapted for receiving electrical power generated by the fuel cell of the mobile vehicle fuel cell power system and adapted for supplying power generated by the fuel cell for use off-board from said mobile vehicle fuel cell power system, and
   communication means for communicating information regarding at least one of the on-board fuel cell operation and off-board station condition parameters to another location.

26. The power system of claim 25 further including fuel supply means for supplying fuel to a mobile vehicle fuel cell power system from the off-board station.

27. The power system of claim 25 further comprising securing means for preventing unwanted access to the fuel and electric connections.

28. The power system of claim 26 further including means for supplying a reactant to said mobile vehicle fuel cell power supply system for use in a fuel reformation process from the off-board station.

29. The power system of claim 28 wherein the reactant supply means includes means for supplying water.

30. The power system of claim 29 wherein the water supply further includes means for preventing said water from freezing.

31. The power system of claim 25 wherein the communication means comprises at least one telecommunication link.

32. The power system of claim 26 further including a fuel meter for metering the fuel provided to said mobile vehicle power system fuel cell by said fuel supply means.

33. The power system of claim 26 further including inverting means for converting electrical power received from said mobile vehicle fuel cell power system from direct current to alternating current, wherein said electrical connection means provides at least a portion of said alternating current for use off-board of said mobile vehicle fuel cell power system.

34. The power system of claim 33 further including power meter means for measuring the amount of alternating current power supplied by said electrical connection means for off-board use.

35. The power system of claim 27 wherein the securing means includes at least one locked enclosure configured to house one of the fuel and electrical connections.

36. The power system of claim 35 wherein said enclosure includes a glass panel mounted on one wall thereof, and a striking element coupled to the enclosure for breaking the glass panel to access said connections.

37. The power system of claim 26 wherein at least one of said fuel supply means and said electrical connection means includes a connector for selected disconnection and connection of said connector to and from said mobile vehicle fuel cell power system.

38. The power system of claim 25, further comprising a gas turbine generator operating in tandem with said mobile fuel cell power system for converting said fuel to electricity.

39. The power system of claim 25, further comprising a heating, ventilation and air conditioning unit operating in tandem with said mobile fuel cell power system for converting said fuel to electricity.

40. A power system for converting fuel to electricity, comprising a first mobile vehicle fuel cell power system and a second mobile electrical power system, the first mobile vehicle fuel cell electric power system including a first rechargeable battery, a fuel cell for converting fuel to electricity and for connection to said battery to recharge said battery, a storage means for storing fuel for said fuel cell, and means for coupling to said second mobile power system for delivering thereto electrical power generated by said fuel cell, and said second mobile power system including a second rechargeable battery, and means for receiving electrical power from said first mobile vehicle fuel cell power system so as to recharge said second battery.

41. A power system for converting fuel to electricity, comprising a mobile vehicle power system and an off-board station, the mobile vehicle power system including a rechargeable battery, power plant means for propelling the vehicle and for conversion of fuel to electrical power and for recharging said battery, a storage means for storing fuel for said power plant, and means for electrical coupling to said off-board station for delivering thereto electrical power generated by said power plant, and said off-board station including means for receiving electrical power from said mobile vehicle power plant, and output means for providing at least a portion of said electrical power for use off-board of said mobile vehicle power system.

42. The power system of claim 41 wherein said mobile vehicle power system includes means for receiving fuel from said off-board station for provision to said power plant, and said off-board station includes means for delivering fuel to said mobile vehicle power system.

* * * * *